Dec. 30, 1958  H. T. SIEFEN ET AL  2,866,822
LOW PRESSURE PRODUCTION OF FORMAMIDES
Filed June 27, 1956
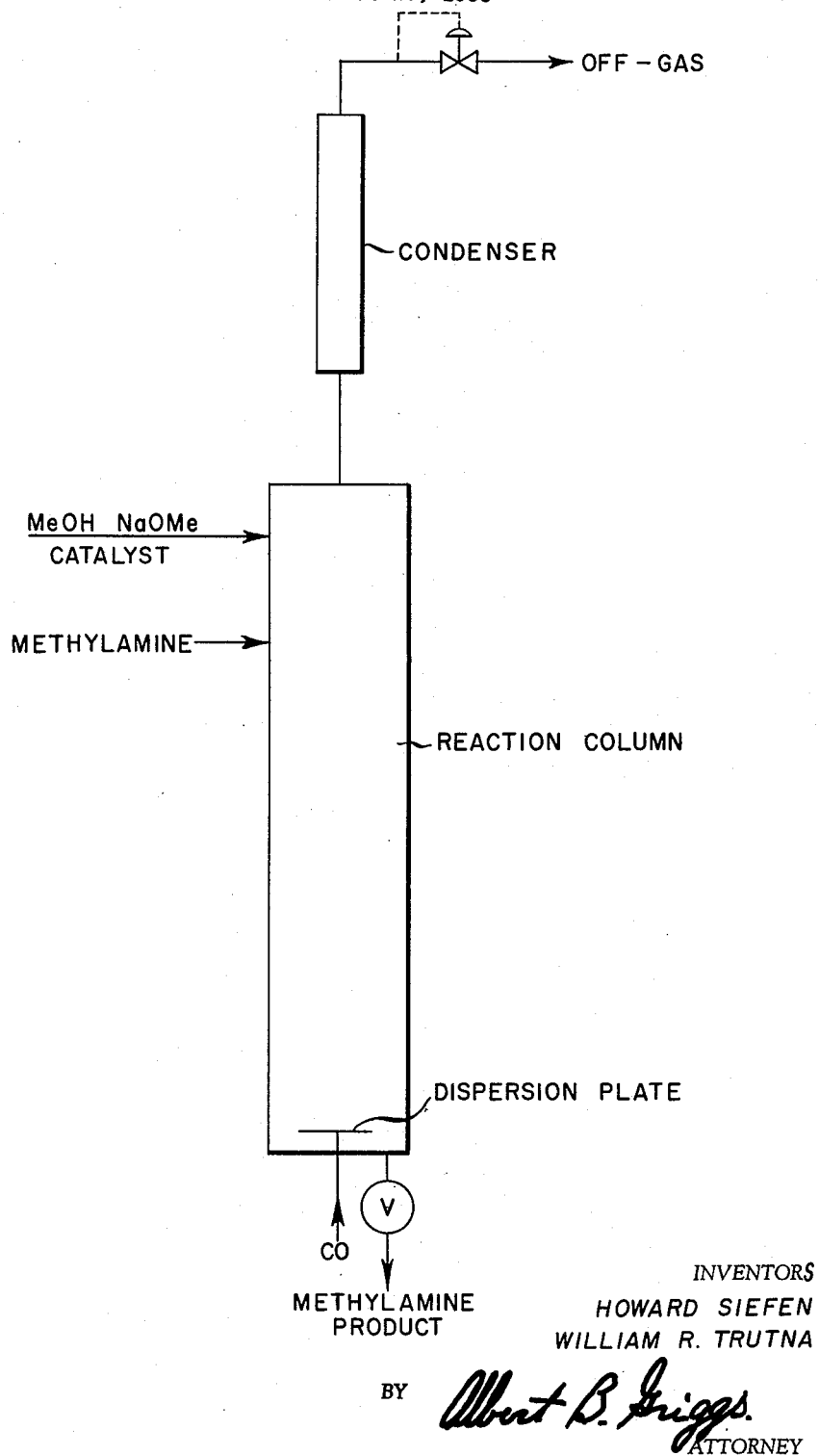
INVENTORS
HOWARD SIEFEN
WILLIAM R. TRUTNA
BY Albert B. Griggs
ATTORNEY United States Patent Office 2,866,822
Patented Dec. 30, 1958

2,866,822

LOW PRESSURE PRODUCTION OF FORMAMIDES

Howard T. Siefen and William R. Trutna, Pasadena, Tex., assignors to E. I. du Pont de Nemours and Company, Wilmington, Del., a corporation of Delaware Application June 27, 1956, Serial No. 594,313

2 Claims. (Cl. 260—561)

This invention relates to the production of methylformamides by reacting the counter-current flow of a methylamine with carbon monoxide under a pressure of about 40 to 135 p. s. i. g. (pounds per square inch, gauge), the carbon monoxide being introduced as bubbles no larger than about 2 millimeters in diameter.

A typical process and apparatus of the invention is illustrated in the drawing in which there is shown semi-diagrammatically the equipment and the reactants employed in processes of the invention.

In processes of the invention a methylamine corresponding to the methylformamide desired is used as one reactant. Thus dimethylamine will be used to prepare dimethylformamide and monomethylamine will be used to produce monomethylformamide. In processes of the invention there can be used any methylamine having less than three methyl groups, in other words, mono- and dimethylamine.

The processes of the invention are conveniently carried out in a vertical reaction column which is provided at the bottom with a dispersion plate for the introduction of carbon monoxide. This plate is a conventional porous plate of a type made as by compressing powdered stainless steel. Instead it can be a porous carbon plate. Any other such porous plate resistant to the reactants can be used.

The porosity is not at all critical but the openings should not be so large as to give bubbles of carbon monoxide of greater diameter than about 2 millimeters. It is preferred that the porosity be such that the bubbles formed at the point of introduction have a diameter of less than one millimeter. The smaller the bubbles the better so long as there is no undue resistance to flow of carbon monoxide. The equipment used must of course be resistant to the reactants.

The processes of the invention can readily be understood by referring to the drawing. A methylamine is added near the top of a reaction column to a flowing body of liquid which passes downwardly. The product is withdrawn at the bottom. Carbon monoxide flows upwardly in counter-current flow to the product and the body of liquid reactants. Catalyst is added at an appropriate point near the top of the reactor. Off-gases from the reaction pass out the reactor near the top and pass through a condenser which returns reflux to the reaction.

The processes of the invention can be readily carried out at relatively low temperatures and pressures to give close to theoretical yields of methylformamide. In general, a temperature in the range of about 20° C. to 160° C. can be employed. Temperatures somewhat outside these ranges are operable but are less desirable. At the lower temperatures, the reaction rate decreases; above about 130° C. unnecessarily high pressures result requiring more complicated and expensive equipment. Preferably, the reaction is carried out at a temperature in the range of about 60 to 130° C.

In carrying out the carbon monoxide-methylamine reaction according to the processes of the invention sufficient pressure is employed to maintain the methylamine liquid at the temperature employed. In general, a pressure in the reaction vessel of from about 40 to 135 p. s. i. g. is used. More narrowly it is preferred to use from about 90 to 125 p. s. i. g.

The carbon monoxide-methylamine reaction is speeded by introducing sufficient carbon monoxide into the reaction zone to maintain in the gaseous portion of the zone a partial pressure of carbon monoxide of from about 25 to 100 p. s. i. g.

According to processes of the invention the methylamine is added to the body of reactants at a point near the top of the reacting body. The amount of methylamine should be such that in the reacting body at the point of addition the concentration of methylamine is below about 50 mol percent of the total of the methylformamide already formed, the methylamine just added, and the catalysts. It is preferred that the methylamine concentration should be from about 1 to 10 mol percent.

The mol percent of methylamine added can readily be determined from a consideration of the reflux rate, taking temperature into account. Alternatively the off-gas can be analyzed to determine the mol percent of the amine in the mixture near the top of the reaction body.

As mentioned previously, methanol and an alkali metal methylate are also employed in the processes of the invention. These materials are only needed in minor amounts and presumably act in the capacity of catalysts. The minimum amount of metal methylate required depends on the purity of the reactants since foreign matters such as water and carbon dioxide destroy the methylate. With pure reactants as little as 0.2% by weight of metal methylate, based on the weight of the methylamine, is sufficient.

Preferably, the methanol and alkali metal methylate are used so as to provide in the reacting mass at least 0.5% by weight of each of these materials based on the weight of the methylamine. Still more preferably, the alkali methylate is used in amounts sufficient to provide in the reacting mass from about 0.5% to 2% by weight based on the weight of the dimethylamine or monomethylamine.

The methanol and alkali methylate are conveniently introduced into the reaction zone in the form of a solution of the alkali metal methylate in the methanol. Thus the total amount of methanol employed in the reaction zone will be in the order of from about 1 to 10% by weight based on the weight of the methylamine. Larger amounts of the methanol and methylate than mentioned above can be used if desired but there is no proportionate advantage in so doing.

The alkali metal methylates preferred are, of course, the sodium and potassium methylates. Sodium methylate is most preferred for economic reasons.

In carrying out this reaction, it is essential to use carbon monoxide that contains no substantial amounts of carbon dioxide and water. We have found that the introduction of either carbon dioxide or water into the reaction mass decreases the reaction rate approximately in direct proportion to the amount of these materials present.

The total amount of carbon dioxide plus water that can be tolerated in the reaction area depends upon the amount of alkali metal methylate present. On a mol basis, the ratio of methylate to carbon dioxide plus water must be greater than 1. At a ratio of 1 or less, no appreciable reaction takes place. To carry on the reaction at a reasonable rate using the preferred amount of methylate, namely about 0.5% to 2% based on the weight of the methylamine, the mol ratio of methylate to carbon dioxide plus water should be at least 2, and preferably is over 3.

Dimethylformamide or monomethylformamide, the desired products of the carbon monoxide-methylamine reaction, are readily separated from the reaction mixture by distillation. Flash distillation at either atmospheric or reduced pressure is a satisfactory method for separating the product from inorganic salts in the reaction mixture. Ion exchange resins can also be used to separate the salts.

The invention is further illustrated by the following example.

Example

A 3-inch diameter, 7 foot long, vertically-mounted stainless-steel tube reactor as shown in the drawing was equipped at its lower end with a 2⅜ inch diameter, stainless-steel dispersion disc of medium porosity for introduction of carbon monoxide. Carbon monoxide is introduced through this dispersion disc as bubbles which have a diameter less than 1 millimeter. An outlet for the removal of liquid product is provided at the bottom of the reactor.

At a point four feet from the bottom of the reactor a liquid dimethylamine feed point was provided and at the upper end a catalyst feed line was provided for the introduction of a solution of sodium methylate in methanol. An off-gas line was provided at the top and this was equipped with a condenser and a pressure regulator set to hold the pressure in the reactor at 50 p. s. i. g. In addition, suitable means for heating and cooling the reactor were provided and a liquid level gauge was attached parallel to the reactor for the determination of the level of the reaction medium.

A total of 15 pounds (0.205 pound mol) of dimethylformamide, 0.111 pound (0.00205 pound mol) of sodium methylate, and 0.328 pound (0.0103 pound mol) of methanol was charged to the reactor and the contents heated to 70° C. while a slow stream of carbon monoxide containing 0.09 percent $CO_2$ and 0.01 percent water was added through the dispersion disc.

When the temperature reached 70° C., the carbon monoxide feed rate was increased to 6.3 pounds per hour (0.266 pound mol per hour). The dimethylamine feed was adjusted to a rate of 9.23 pounds per hour (0.205 pound mol per hour) and the catalyst solution feed was started at a rate of 0.111 pound per hour of sodium methylate and 0.328 pound per hour of methanol.

Immediate reaction necessitated the use of cooling water to maintain the temperature at 70° C. Liquid product was continuously removed at such a rate that the level was maintained at 5 feet in the reactor. The carbon monoxide and traces of inert were released through the pressure regulator which maintained a pressure of 50 p. s. i. g. in the reactor.

After two hours of operation, samples were withdrawn from the reactor and it was found that less than 0.5 percent of the dimethylamine remained unconverted. This was confirmed by the off-gas rate of 0.6 pound per hour of carbon monoxide.

A process as just described using like amounts of monomethylamine was operated to produce monomethylformamide.

We claim:

1. In a process for the production of methylformamides, the steps comprising effecting reaction of a methylamine selected from the group consisting of methylamine and dimethylamine with carbon monoxide substantially free of carbon dioxide and water and using minor amounts of an alkali metal methylate and methanol as a catalyst, the reaction being conducted with a downwardly flowing body of reaction product and an upward, counter-current flow of the carbon monoxide, the amine being added near the top of the reaction body, the process being conducted under the following conditions:

Temperature, 20 to 160° C.
Pressure, 40 to 135 p. s. i. g.
Methylamine concentration at the point of addition from 1 to 50 mol percent of the total composition at the point of addition the carbon monoxide being added into the body as bubbles no larger than 2 millimeters in diameter.

2. In a process for the production of methylformamides, the steps comprising effecting reaction of a methylamine selected from the group consisting of methylamine and dimethylamine with carbon monoxide substantially free of carbon dioxide and water and using minor amounts of an alkali metal methylate and methanol as a catalyst, the reaction being conducted with a downwardly flowing body of reaction product and an upward, counter-current flow of the carbon monoxide, the amine being added near the top of the reaction body, the process being conducted under the following conditions:

Temperature, 60 to 130° C.
Pressure, 90 to 125 p. s. i. g.
Methylamine concentration at the point of addition 1 to 10 mol percent of the total composition at the point of addition after the addition the carbon monoxide being added through a dispersion means which introduces it into the body as bubbles no larger than 1 millimeter in diameter.

References Cited in the file of this patent

UNITED STATES PATENTS

| | | |
|---|---|---|
| 1,777,777 | Wietzel | Oct. 7, 1930 |

FOREIGN PATENTS

| | | |
|---|---|---|
| 1,029,151 | France | Mar. 4, 1953 |

OTHER REFERENCES

Fiat Final Report 925, August 30, 1946 (page 2 relied on).

UNITED STATES PATENT OFFICE
CERTIFICATE OF CORRECTION

Patent No. 2,866,822                         December 30, 1958

Howard T. Siefen et al.

It is hereby certified that error appears in the printed specification of the above numbered patent requiring correction and that the said Letters Patent should read as corrected below.

Column 3, line 41, for "0.266" read -- 0.226 --.

Signed and sealed this 30th day of June 1959.

(SEAL)

Attest:

KARL H. AXLINE
Attesting Officer

ROBERT C. WATSON
Commissioner of Patents